(12) United States Patent
Beguin et al.

(10) Patent No.: US 12,551,611 B2
(45) Date of Patent: Feb. 17, 2026

(54) METHOD FOR TESTING PIEZOELECTRIC SOUND TRANSDUCER

(71) Applicant: Becton, Dickinson and Company, Franklin Lakes, NJ (US)

(72) Inventors: Steve Beguin, Rathdrum (IE); Maurice Curtin, Blackrock (IE); Simon O'Reilly, Dublin (IE)

(73) Assignee: Becton, Dickinson and Company, Franklin Lakes, NJ (US)

( * ) Notice: Subject to any disclaimer, the term of this patent is extended or adjusted under 35 U.S.C. 154(b) by 629 days.

(21) Appl. No.: 17/527,645

(22) Filed: Nov. 16, 2021

(65) Prior Publication Data

US 2022/0152294 A1    May 19, 2022

Related U.S. Application Data

(60) Provisional application No. 63/114,879, filed on Nov. 17, 2020.

(51) Int. Cl.
*A61M 5/142*    (2006.01)
*G01R 19/145*    (2006.01)
(Continued)

(52) U.S. Cl.
CPC ....... *A61M 5/14244* (2013.01); *G01R 19/145* (2013.01); *G01R 19/15* (2013.01);
(Continued)

(58) Field of Classification Search
CPC .... G01R 19/145; G01R 19/15; G01R 19/155; G01R 19/165; G01R 29/22; A61M 2205/0294; A61M 2205/581; A61M 2205/70; A61M 2205/8206; A61M 5/14244; A61M 15/0085; A61M 2005/14208; H04R 3/04
(Continued)

(56) References Cited

U.S. PATENT DOCUMENTS 5,376,854 A  *  12/1994  Oouchi ............... H10N 30/802
                                                        340/635
6,485,465 B2    11/2002  Moberg et al.
(Continued)

FOREIGN PATENT DOCUMENTS

CN       106405214 B  *  4/2019  ........... G01R 19/252
DE    102008002485 A1    12/2009
(Continued)

OTHER PUBLICATIONS

CN 106405214 Machine Translation (Year: 2019).*

*Primary Examiner* — Suman K Nath
(74) *Attorney, Agent, or Firm* — The Webb Law Firm

(57) ABSTRACT

A method for testing a drug delivery device including a piezoelectric transducer, a microcontroller, and a DC power source, with the piezoelectric transducer having an operative state and inoperative state. The method includes providing a drive signal to the piezoelectric transducer of the drug delivery device, determining an actuation voltage value or an actuation current value, and comparing the actuation voltage value or the actuation current value to a baseline value to determine whether the piezoelectric transducer is in the operative state or the inoperative state.

25 Claims, 15 Drawing Sheets

(51) Int. Cl.
*G01R 19/15* (2006.01)
*G01R 19/155* (2006.01)
*G01R 19/165* (2006.01)
*G01R 29/22* (2006.01)
*H04R 3/04* (2006.01)
*A61M 15/00* (2006.01)
*H04R 17/00* (2006.01)

(52) U.S. Cl.
CPC ......... *G01R 19/155* (2013.01); *G01R 19/165* (2013.01); *G01R 29/22* (2013.01); *H04R 3/04* (2013.01); *A61M 2005/14208* (2013.01); *A61M 15/0085* (2013.01); *A61M 2205/0294* (2013.01); *A61M 2205/581* (2013.01); *A61M 2205/70* (2013.01); *A61M 2205/8206* (2013.01); *H04R 17/00* (2013.01)

(58) Field of Classification Search
USPC .......................................................... 73/584
See application file for complete search history.

(56) References Cited

U.S. PATENT DOCUMENTS

| | | | |
|---|---|---|---|
| 7,348,155 | B2 | 3/2008 | Kostenis et al. |
| 9,956,356 | B2* | 5/2018 | Grehan ................ A61M 11/001 |
| 2002/0034166 | A1 | 3/2002 | Barany et al. |
| 2007/0146399 | A1 | 6/2007 | Yamamoto et al. |
| 2010/0264931 | A1 | 10/2010 | Lindegger et al. |
| 2013/0300422 | A1 | 11/2013 | Rodriguez-Amaya et al. |
| 2014/0054883 | A1 | 2/2014 | Lanigan et al. |
| 2016/0248346 | A1 | 8/2016 | Sadasivam et al. |
| 2017/0001030 | A1 | 1/2017 | Pribula et al. |
| 2018/0256829 | A1* | 9/2018 | Grehan ................ A61M 11/005 |
| 2019/0287355 | A1 | 9/2019 | Buss et al. |

FOREIGN PATENT DOCUMENTS

| | | | | |
|---|---|---|---|---|
| JP | 2002126092 | A | 5/2002 | |
| WO | 03003018 | A2 | 1/2003 | |
| WO | 2005063491 | A1 | 7/2005 | |
| WO | 2017002065 | A1 | 1/2017 | |
| WO | WO-2017055166 | A1 * | 4/2017 | ............ A61M 11/00 |

* cited by examiner

1

METHOD FOR TESTING PIEZOELECTRIC SOUND TRANSDUCER

CROSS-REFERENCE TO RELATED APPLICATION

This application claims priority to U.S. Provisional Application No. 63/114,879, filed Nov. 17, 2020, entitled "Method for Testing Piezoelectric Sound Transducer", which is hereby incorporated by referenced in its entirety.

BACKGROUND OF THE INVENTION

Field of the Invention

The present disclosure relates to a method for testing a piezoelectric sound transducer for a drug delivery device.

Description of Related Art

Wearable medical devices, such as automatic injectors, have the benefit of providing therapy to the patient at a location remote from a clinical facility and/or while being worn discretely under the patient's clothing. The wearable medical device can be applied to the patient's skin and configured to automatically deliver a dose of a pharmaceutical composition within a predetermined time period after applying the wearable medical device to the patient's skin, such as after a 27 hour delay. After the device delivers the pharmaceutical composition to the patient, the patient may subsequently remove and dispose of the device.

Wearable medical devices may have audible, tactile, or visual indicators to indicate a status of the device, such as when a drug delivery is started or completed or if a malfunction is detected. Piezoelectric transducers are used to provide an audible and/or tactile indicator for wearable medical devices. As the indicators for the wearable medical device play an important part of the function of the medical device, the function of the indicators is tested during manufacturing of the medical device. One solution for testing the audible indicator is to test the function of the audible indicator using a microphone, which has limitations depending on external noise levels in the manufacturing or testing environment.

SUMMARY OF THE INVENTION

In one aspect or embodiment, a method for testing a drug delivery device including a piezoelectric transducer, a microcontroller, and a DC power source, with the piezoelectric transducer having an operative state and inoperative state, includes: providing a drive signal to the piezoelectric transducer of the drug delivery device; determining an actuation voltage value or an actuation current value; and comparing the actuation voltage value or actuation current value to a baseline value to determine whether the piezoelectric transducer is in the operative state or the inoperative state.

The actuation voltage value or the actuation current value may be determined from an average of a plurality of values measured during a predetermined period of time. The actuation voltage value or the actuation current value may be determined from a subset of a plurality of values measured during a predetermined period of time. A curve fitting may be used to determine the actuation voltage value or the actuation current value. At least one of a Fourier transform and a Fast Fourier transform may be used to determine the actuation voltage value or the actuation current value. A signal used to determine the actuation voltage value or the actuation current value may be computed over a time greater than 10 ms. A signal used to determine the actuation voltage value or the actuation current value may be computed over a time greater than 1 ms.

The actuation voltage value may be a voltage frequency of the DC power source when the drive signal is provided to the piezoelectric transducer, and the baseline value may be a known voltage frequency of the DC power source when the drive signal is provided to the piezoelectric transducer and the piezoelectric transducer is in the operative state. The actuation voltage value may be a frequency of maximum voltage drop values when the drive signal is provided to the piezoelectric transducer, and the baseline value may be a known frequency of maximum voltage drop values when the drive signal is provided to the piezoelectric transducer and the piezoelectric transducer is in the operative state.

The actuation voltage value may be a minimum and maximum voltage of the DC power source when the drive signal is provided to the piezoelectric transducer, and the baseline value may be a known minimum and maximum voltage when the drive signal is provided to the piezoelectric transducer and the piezoelectric transducer is in the operative state.

The piezoelectric transducer may be determined to be in the operative state when the actuation voltage value is within a predetermined range of the baseline value. The piezoelectric transducer may be actuated in the operative state and not actuated in the inoperative state. The determining of the actuation voltage value may include measuring voltage at terminals of the DC power source or the voltage at terminals of the piezoelectric transducer. The DC power source may be a battery.

In a further aspect or embodiment, a computer-implemented method for testing a drug delivery device including a piezoelectric transducer, a microcontroller, and a DC power source, with the piezoelectric transducer having an operative state and inoperative state, includes: providing a drive signal to the piezoelectric transducer of the drug delivery device; determining an actuation voltage value or actuation current value; and determining with at least one processor whether the piezoelectric transducer is in the operative state or the inoperative state by comparing the actuation voltage value to a baseline voltage value.

In a further aspect or embodiment, a drug delivery device includes: a DC power source; a cannula; a reservoir configured to receive a fluid; a pump configured to deliver a fluid from the reservoir to the cannula; a piezoelectric transducer having an operative state where the piezoelectric transducer produces an audible sound and an inoperative state where the piezoelectric transducer does not produce an audible sound; and a microcontroller including at least one processor programmed or configured to: provide a drive signal to the piezoelectric transducer; determine an actuation voltage value; and determine with the at least one processor whether the piezoelectric transducer is in the operative state or the inoperative state by comparing the actuation voltage value or actuation current value to a baseline value.

In a further aspect or embodiment, a computer program product for testing a drug delivery device comprising a piezoelectric transducer, a microcontroller, and a DC power source, with the piezoelectric transducer having an operative state and inoperative state, and the computer program product including at least one non-transitory computer-readable medium including program instructions that, when executed by the microcontroller, cause the microcontroller to: provide a drive signal to the piezoelectric transducer; determine an actuation voltage value or an actuation current value; and determine whether the piezoelectric transducer is in the operative state or the inoperative state by comparing the actuation voltage value or the actuation current value to a baseline value.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION OF THE INVENTION

Figure 1:
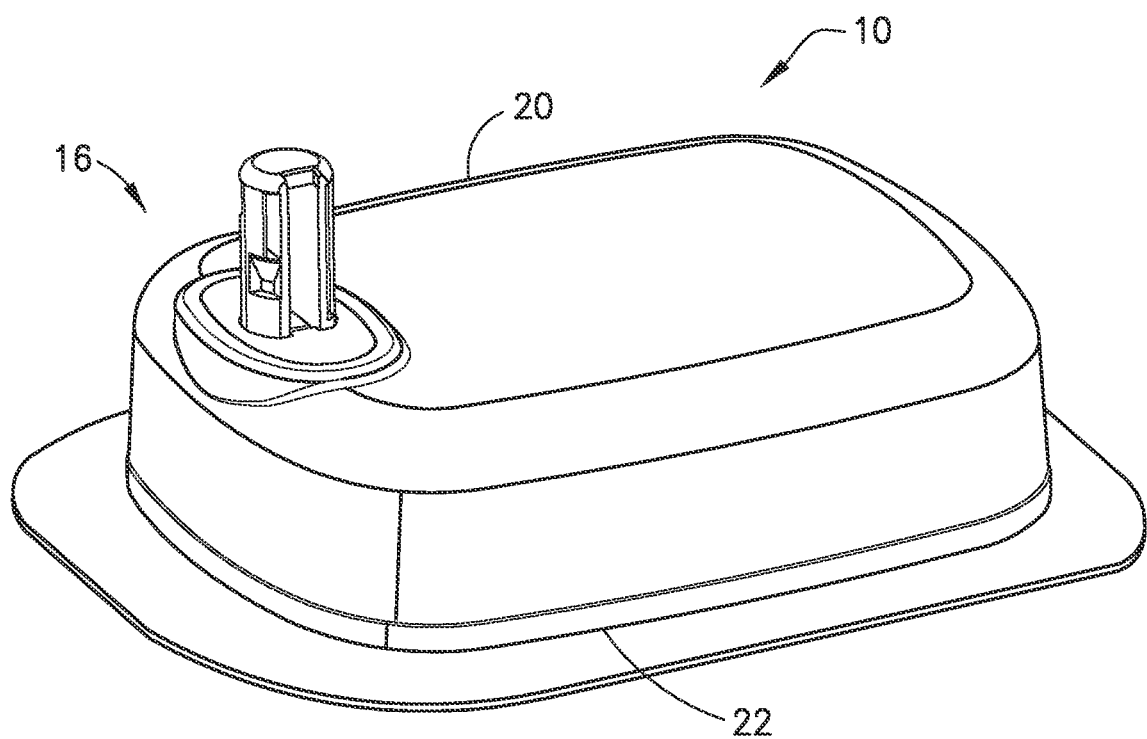
FIG. 1 is a perspective view of a drug delivery device according to one aspect or embodiment of the present application.
Figure 2:
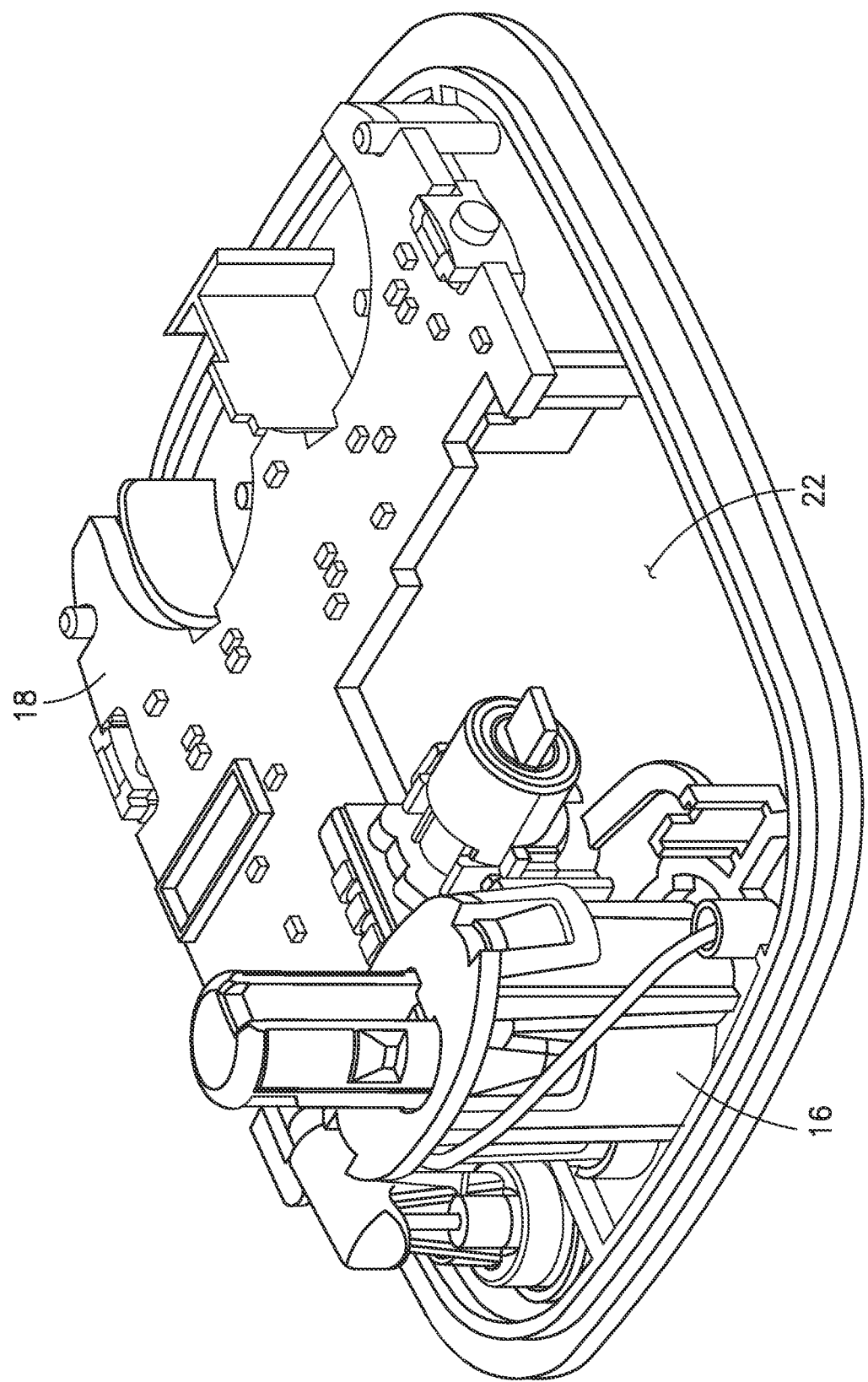
FIG. 2 is a perspective view of the drug delivery device of FIG. 1, with a top cover removed.

Spatial or directional terms, such as "left", "right", "inner", "outer", "above", "below", and the like, are not to be considered as limiting as the invention can assume various alternative orientations.

All numbers used in the specification and claims are to be understood as being modified in all instances by the term "about". By "about" is meant a range of plus or minus ten percent of the stated value. As used in the specification and the claims, the singular form of "a", "an", and "the" include plural referents unless the context clearly dictates otherwise. The terms "first", "second", and the like are not intended to refer to any particular order or chronology, but instead refer to different conditions, properties, or elements. By "at least" is meant "greater than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes one or more of A alone; or one or more of B alone; or one or more of C alone; or one or more of A and one or more of B; or one or more of A and one or more of C; or one or more of B and one or more of C; or one or more of all of A, B, and C.

As used herein, the term "processor" may refer to one or more electronic devices configured to process data. A processor may, in some examples, include the necessary components to receive, process, and output data, such as a processor, a display, a memory, an input device, a network interface, and/or the like. A processor may be a mobile device. A processor may also be a desktop computer or other form of non-mobile computer.

Referring to FIGS. 1-4 a drug delivery device 10 includes a reservoir 12, a power source 14, an insertion mechanism 16, control electronics 18, a cover 20, and a base 22. In one aspect or embodiment, the drug delivery device 10 is a wearable automatic injector, such as an insulin or bone marrow stimulant delivery device. The drug delivery device 10 may be mounted onto the skin of a patient and triggered to inject a pharmaceutical composition from the reservoir 12 into the patient. The drug delivery device 10 may be pre-filled with the pharmaceutical composition, or it may be filled with the pharmaceutical composition by the patient or medical professional prior to use.

The drug delivery device 10 is configured to deliver a dose of a pharmaceutical composition, e.g., any desired medicament, into the patient's body by a subcutaneous injection at a slow, controlled injection rate. Exemplary time durations for the delivery achieved by the drug delivery device 10 may range from about 5 minutes to about 60 minutes, but are not limited to this exemplary range. Exemplary volumes of the pharmaceutical composition delivered by the drug delivery device 10 may range from about 0.1 milliliters to about 10 milliliters, but are not limited to this exemplary range. The volume of the pharmaceutical composition delivered to the patient may be adjusted.

Referring again to FIGS. 1-4, in one aspect or embodiment, the power source 14 is a DC power source including one or more batteries. The control electronics 18 include a microcontroller 24, sensing electronics 26, a pump and valve controller 28, sensing electronics 30, and deployments electronics 32, which control the actuation of the drug delivery device 10. The drug delivery device 10 includes a fluidics sub-system that includes the reservoir 12, volume sensor 34 for the reservoir 12, a reservoir fill port 36, and a metering sub-system 38 including a pump and valve actuator 40 and a pump and valve mechanism 42. The fluidic sub-system may further include an occlusion sensor 44, a deploy actuator 46, and a cannula 48 for insertion into a patient's skin. In one aspect or embodiment, the insertion mechanism 16 is configured to move the cannula 48 from a retracted position positioned entirely within the drug delivery device 10 to an extended position where the cannula 48 extends outside of the drug delivery device 10. The drug delivery device 10 may operate in the same manner as discussed in U.S. Pat. No. 10,449,292 to Pizzochero et al.

Figure 3:
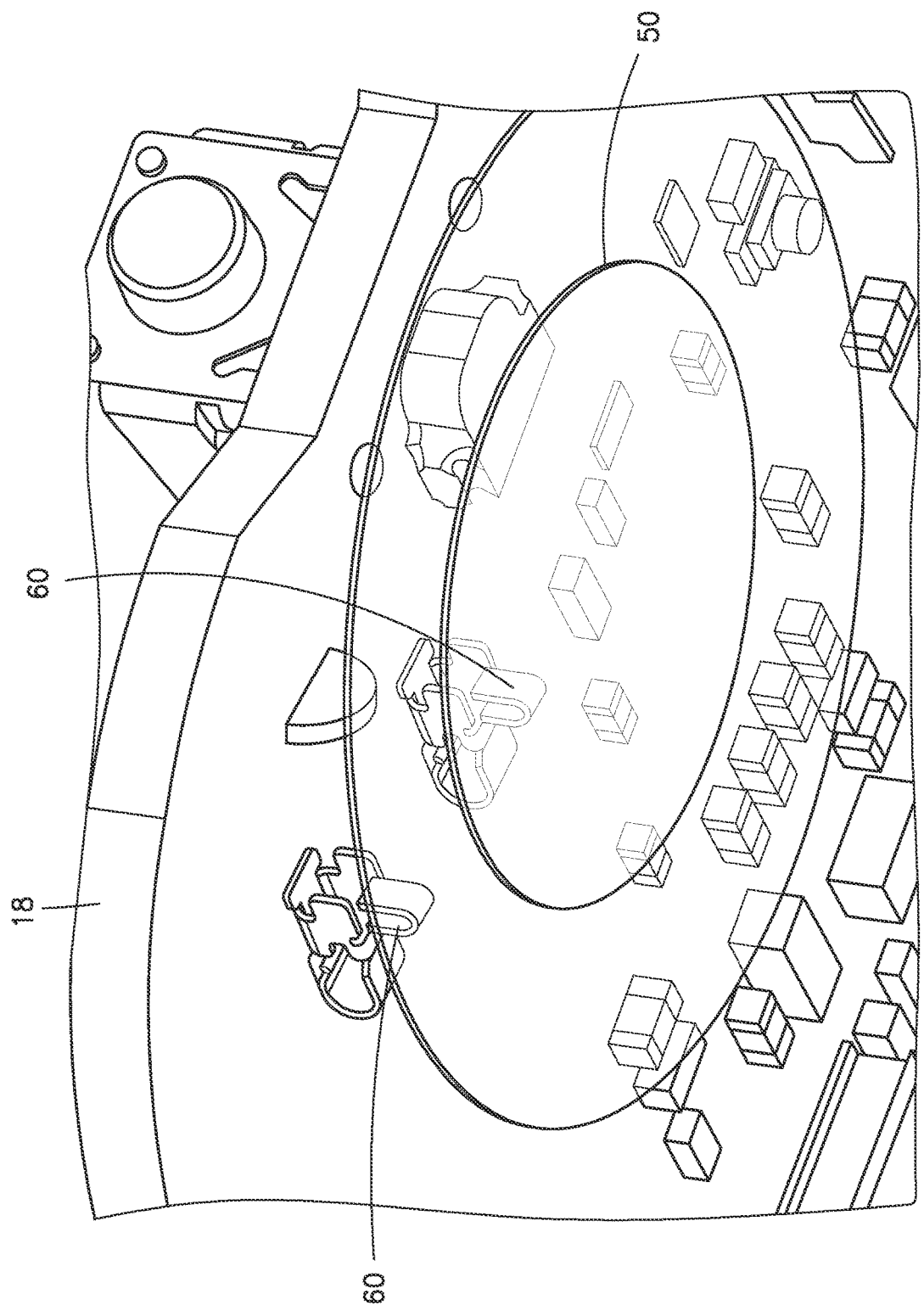
FIG. 3 is a partial perspective view of the drug delivery device of FIG. 1.
Figure 4:
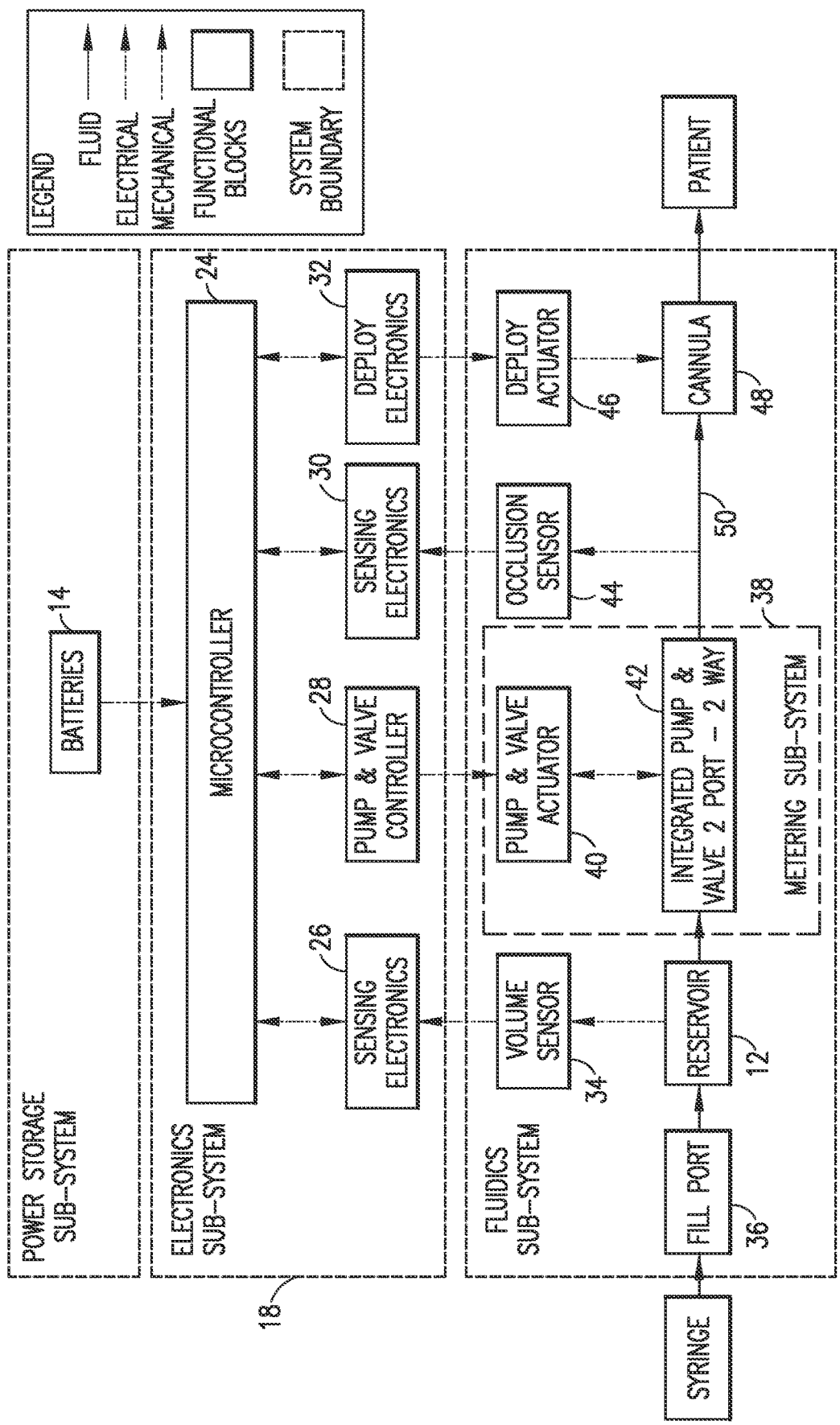
FIG. 4 is a schematic view of the drug delivery device of FIG. 1.
Figure 5:
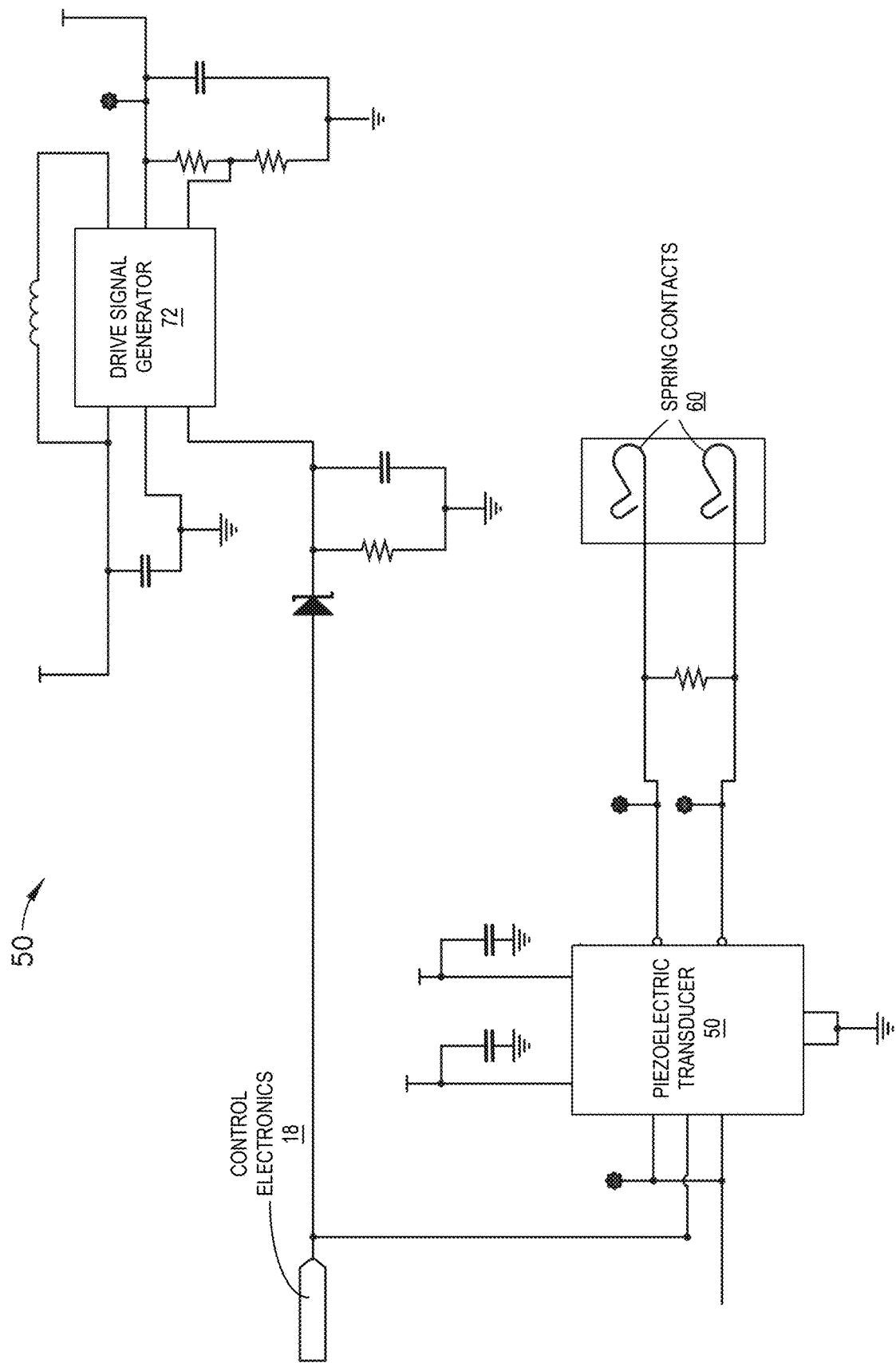
FIG. 5 is a schematic view of a piezoelectric transducer circuit of the drug delivery device of FIG. 1 according to one aspect or embodiment of the present application.

Referring to FIGS. 3 and 5, the drug delivery device 10 also includes a piezoelectric transducer 50 configured to provide an audible and/or tactile indication to a user on a status of the drug delivery device 10. In one aspect or embodiment, the piezoelectric transducer 50 is connected to the control electronics 18 via one or more spring contacts 60. The piezoelectric transducer 50 has an operative state where the piezoelectric transducer 50 is actuated, produces an audible sound, movement, and/or vibration and an inoperative state where the piezoelectric transducer 50 is not actuated, does not produce an audible sound, movement, and/or vibration when a signal is supplied from the signal generating system, such as the microcontroller 24.

Referring to FIGS. 6A-15, according to one aspect or embodiment of the present application, a method for testing 70 the drug delivery device 10 includes: providing a drive signal 72 to the piezoelectric transducer 50 of the drug delivery device 10; measuring an actuation voltage value 74; and comparing 76 the actuation voltage value to a baseline value to determine whether the piezoelectric transducer 50 is in the operative state or the inoperative state. If the actuation voltage value is within a predetermine range of the baseline value, such as within 5% of the baseline value, the piezoelectric transducer 50 is determined to be in the operative state and has a passed test status 78. If the actuation voltage value is not within a predetermine range of the baseline value, such as within 5% of the baseline value, the piezoelectric transducer 50 is determined to be in the inoperative state and has a failed test status 80. One possible cause of a failed test is insufficient contact between the spring contacts 60 of the piezoelectric transducer 50 and the control electronics 18. The method of the present application allows for a self-test of the drug delivery device 10 to determine whether the piezoelectric transducer 50 is properly connected and operating without requiring dedicated circuitry or hardware and without requiring separate data handling, data processing, and traceability. The method 70 of the present application does not require any additional equipment and is insensitive to ambient noise. Further, the method 70 of the present application, as detailed below, utilizes a voltage reading from the power source 14, which is typically already monitored by the microcontroller 24 to detect the levels of the power source 14. Accordingly, the method 70 of the present application does not necessitate further connection between electronic components.

Referring to FIGS. 6A-14, in one aspect or embodiment, the actuation voltage value is a voltage frequency of the DC power source 14 when the drive signal is provided to the piezoelectric transducer 50, and the baseline value is a known voltage frequency of the DC power source 14 when the drive signal is provided to the piezoelectric transducer 50 and the piezoelectric transducer 50 is in the operative state. More specifically, the actuation voltage value is a frequency of maximum voltage drop values when the drive signal is provided to the piezoelectric transducer 50, and where the baseline value is a known frequency of maximum voltage drop values when the drive signal is provided to the piezoelectric transducer 50 and the piezoelectric transducer 50 is in the operative state. In one aspect or embodiment, the drive signal is a square wave at a predetermined frequency. In a further aspect or embodiment, the actuation voltage value is a minimum and maximum voltage of the DC power source 14 when the drive signal is provided to the piezoelectric transducer 50, and the baseline value is a known minimum and maximum voltage when the drive signal is provided to the piezoelectric transducer 50 and the piezoelectric transducer 50 is in the operative state. In a further aspect or embodiment, an operating frequency may be modulated over a second lower frequency, essentially turning on and off the transducer actuation circuit as part of the testing procedure. The voltage value may be calculated from a difference between the active and inactive voltage measured at a selected location directly or indirectly connected to the piezoelectric transducer 50. The reference and measured values may be a voltage or an electric current.

Figure 6B:
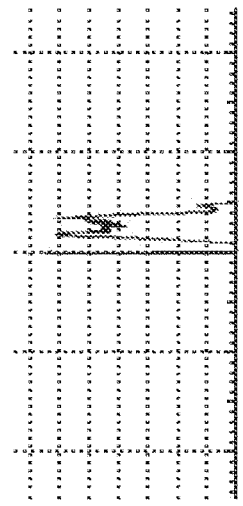
FIG. 6B is a histogram of the graph of FIG. 6A.
Figure 7B:
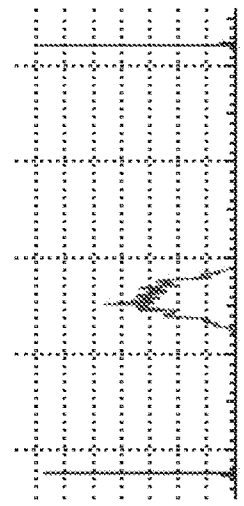
FIG. 7B is a histogram of the graph of FIG. 7A.
Figure 8B:
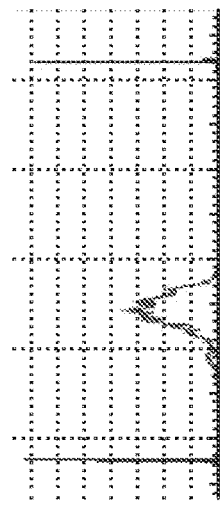
FIG. 8B is a histogram of the graph of FIG. 8A.
Figure 6A:
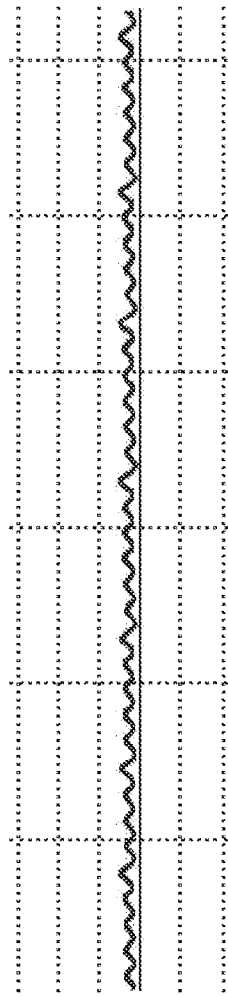
FIG. 6A a graph of voltage versus time of a power source and piezoelectric transducer of the drug delivery device of FIG. 1 when the drug delivery device is activated and a piezoelectric transducer circuit is inactive.
Figure 7A:
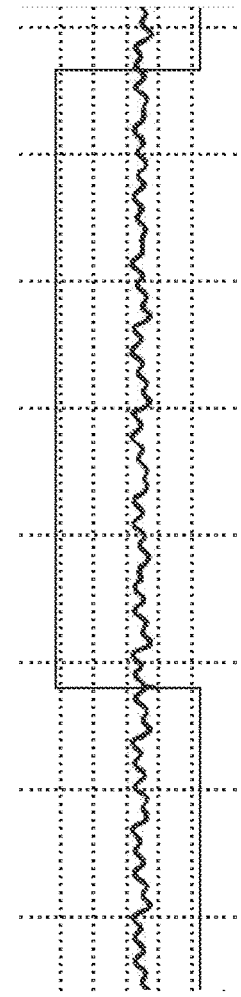
FIG. 7A is a graph of voltage versus time of a power source and a piezoelectric transducer of the drug delivery device of FIG. 1 when the drug delivery device is activated, a piezoelectric transducer circuit is activated, and a piezoelectric transducer is disconnected.
Figure 8A:
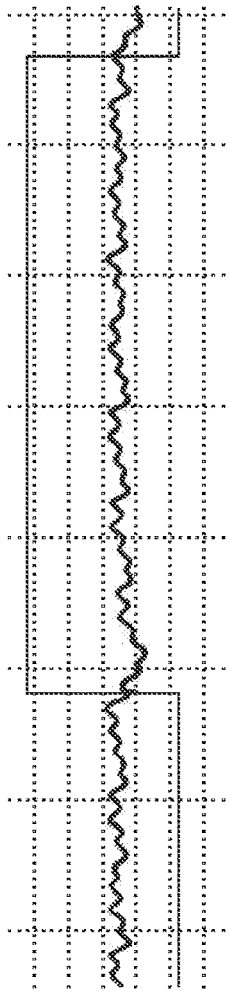
FIG. 8A is a graph of voltage versus time of a power source and piezoelectric transducer of the drug delivery device of FIG. 1 when the drug delivery device is activated, a piezoelectric transducer circuit is activated, and a piezoelectric transducer is connected.

As shown in FIGS. 6A and 6B, with the drug delivery device 10 activated or awake and with the drive signal not being provided, the voltage of the power source 14 measured at the power source terminals oscillates between 1.505V and 1.525V while the drive signal remains constant at 1.5V. As shown in FIGS. 7A and 7B, with the drug delivery device 10 activated or awake, the drive signal being provided, and the piezoelectric transducer 50 disconnected, the voltage of the power source 14 measured at the power source terminals oscillates between 1.425V and 1.455V, which is an approximate 0.12V shift from FIGS. 6A and 6B, and the drive signal oscillates between 1.358V and 1.61V. As discussed in more detail below, high frequency spikes of maximum voltage drop values occur when the drive signal voltage and power source voltage are equal. As shown in FIGS. 8A and 8B, with the drug delivery device 10 activated or awake, the drive signal being provided, and the piezoelectric transducer 50 connected, the voltage of the power source 14 measured at the power source terminals oscillates between 1.41V and 1.455V and the drive signal oscillates between 1.358V and 1.61V. Compared to the state of FIGS. 7A and 7B, the voltage distribution has shifted down by approximately 5 mV in the state of FIGS. 8A and 8B. Accordingly, by comparing the minimum and maximum voltage of the power source to the known minimum and maximum voltage when the piezoelectric transducer 50 is properly connected and in the operative state, the operating state of the piezoelectric transducer 50 can be determined. As shown in FIG. 8A, as well, the pattern or harmonics of the high frequency spikes of maximum voltage drop values is different compared to the pattern of FIG. 7A, which is discussed in additional detail below. The pattern may be observed either by analyzing the signal in the time domain or frequency domain using Fast Fourier Transform (FFT).

Figure 9:
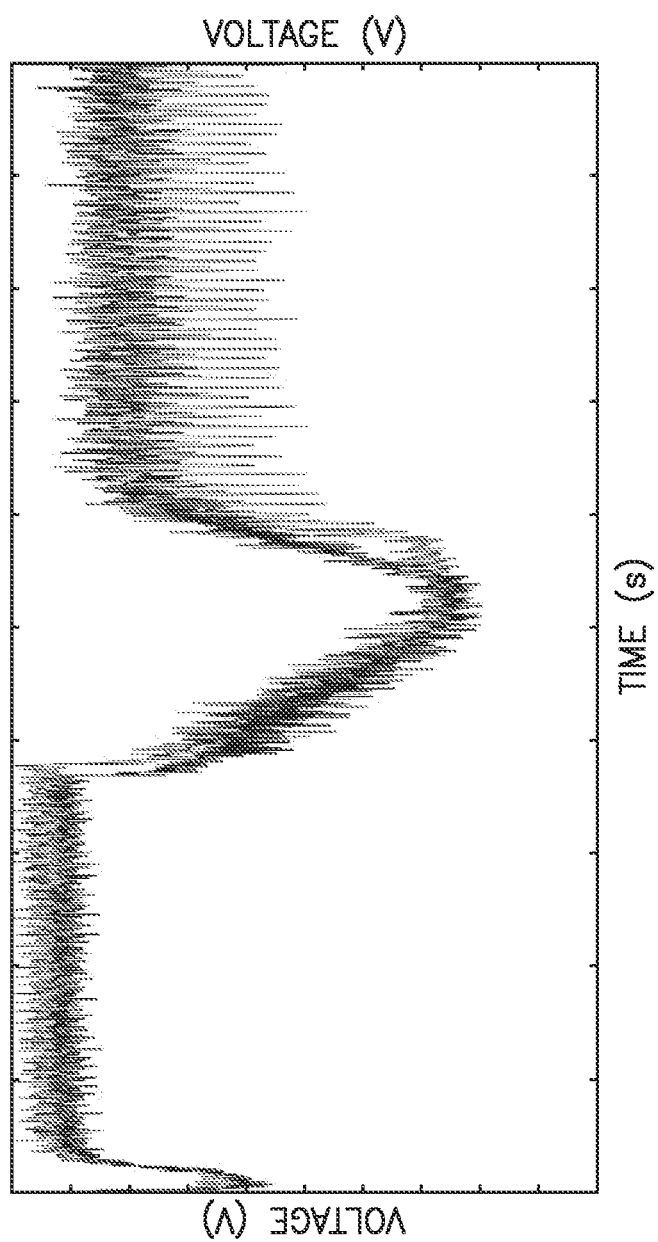
FIG. 9 is a graph of voltage versus time of a power source of the drug delivery device of FIG. 1, showing a voltage with a piezoelectric transducer connected and a voltage without a piezoelectric transducer connected.

Referring to FIG. 9, a voltage drop of approximately 0.15V occurs at the start of the drive signal activation, which occurs with the piezoelectric transducer 50 connected and with the piezoelectric transducer 50 disconnected. The voltage drop of 0.15V occurs over 0.005 s. As shown in FIG. 9, however, the voltage of the power source 14 recovers at a slightly lower level, a difference of approximately 0.02V, when the piezoelectric transducer 50 is connected. In a further aspect or embodiment, the method 70 of testing the drug delivery device 10 to determine the operation status of the piezoelectric transducer 50 includes comparing a voltage recovery value after initially providing the drive signal.

Figure 10:
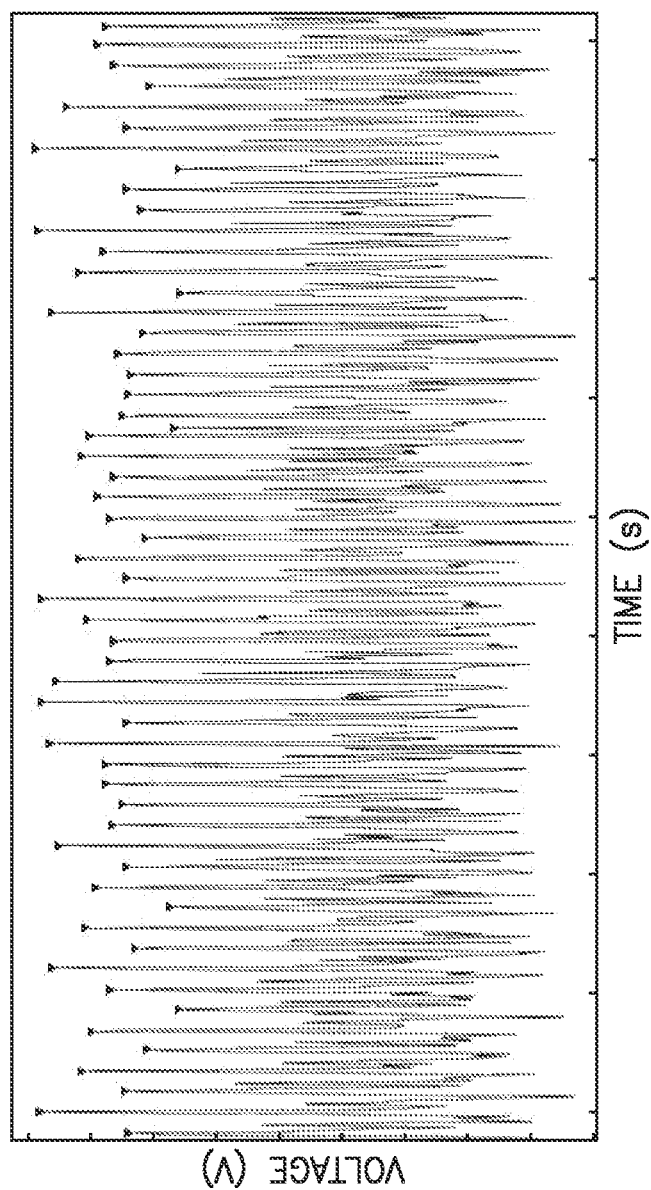
FIG. 10 is a graph of voltage versus time of a power source of the drug delivery device of FIG. 1, showing a frequency of maximum voltage drops.

Referring to FIG. 10, an inverted voltage of the power source 14 is shown while the piezoelectric transducer 50 is connected and operating at 2.9 kHz. The frequency of the maximum voltage drop values or spikes of the power source 14 corresponds to the frequency of the drive signal, which only occurs when the piezoelectric transducer 50 is properly connected. Accordingly, by comparing the frequency of the maximum voltage drop values of the power source 14 to the known frequency of the maximum voltage drop values for a given frequency of the drive signal, the operating state of the piezoelectric transducer 50 can be determined. In other words, if the frequency of the maximum voltage drop values of the power source 14 matches the known frequency of the maximum voltage drop values when the piezoelectric transducer 50 is properly connected, the piezoelectric transducer 50 can be determined to be in the operative state. If the frequency of the maximum voltage drop values of the power source 14 does not match the known frequency of the maximum voltage drop values when the piezoelectric transducer 50 is properly connected, the piezoelectric transducer 50 can be determined to be in the inoperative state. If the spikes or frequency of maximum voltage drop values are present, but do not match the known values of a properly connected piezoelectric transducer 50, a determination can also be made that the drive signal is functioning.

Figure 11:
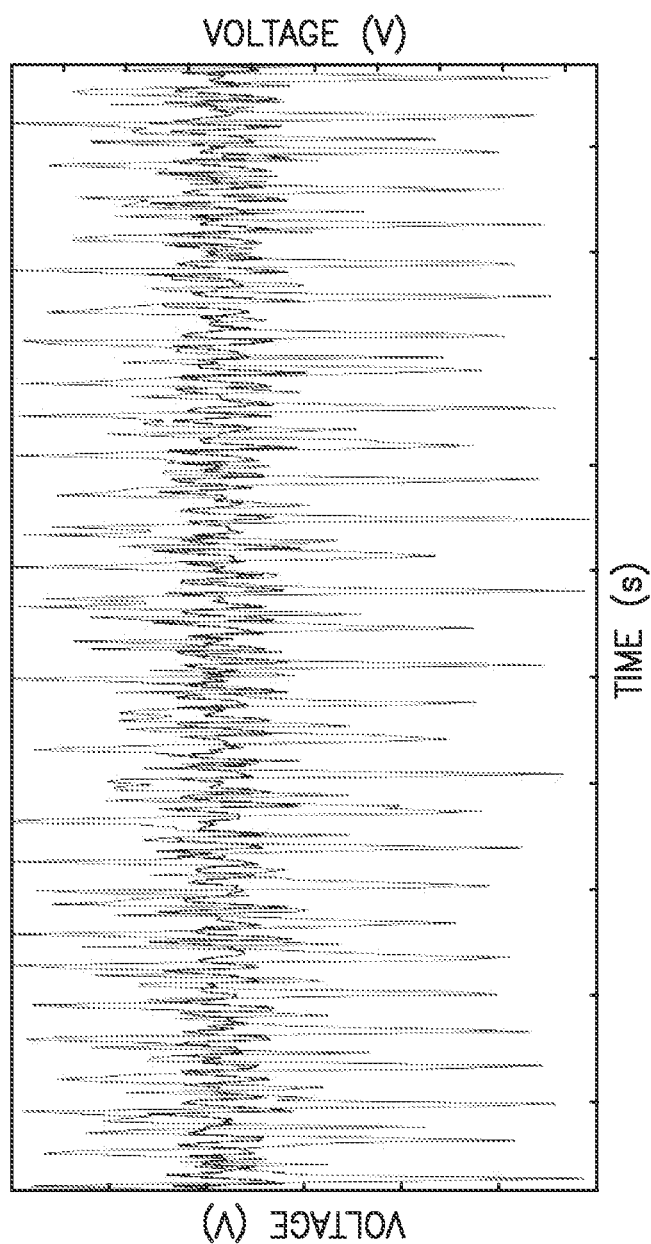
FIG. 11 is a graph of voltage versus time of a power source of the drug delivery device of FIG. 1, showing a comparison of a voltage with a piezoelectric transducer connected and a voltage without a piezoelectric transducer connected.

Referring to FIG. 11, a comparison of the voltage of the power source 14 is shown with the drive signal provided and the piezoelectric transducer 50 disconnected and with the piezoelectric transducer 50 connected. As discussed above, the frequency of the maximum voltage drop values only occur at the frequency of the drive signal when the piezoelectric transducer 50 is properly connected.

Figure 12:
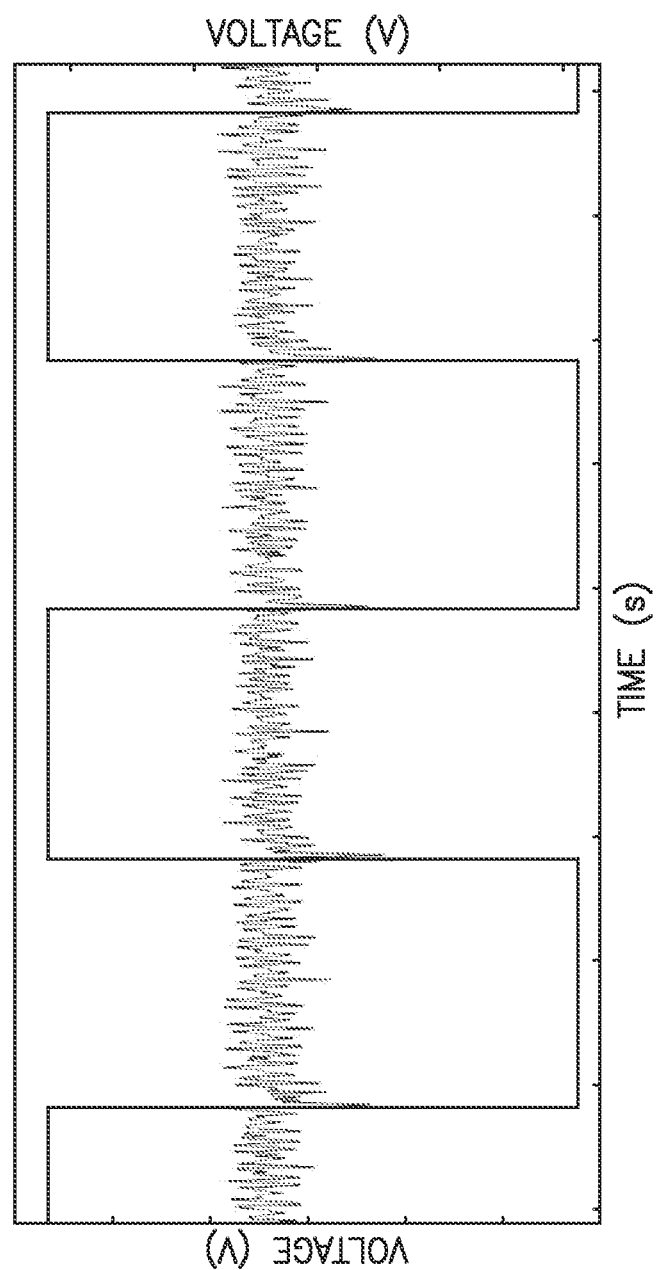
FIG. 12 is a graph of voltage versus time of a power source of the drug delivery device of FIG. 1, showing a comparison of a voltage frequency of the power source with a piezoelectric transducer connected and a 250 Hz frequency of the piezoelectric transducer.
Figure 13:
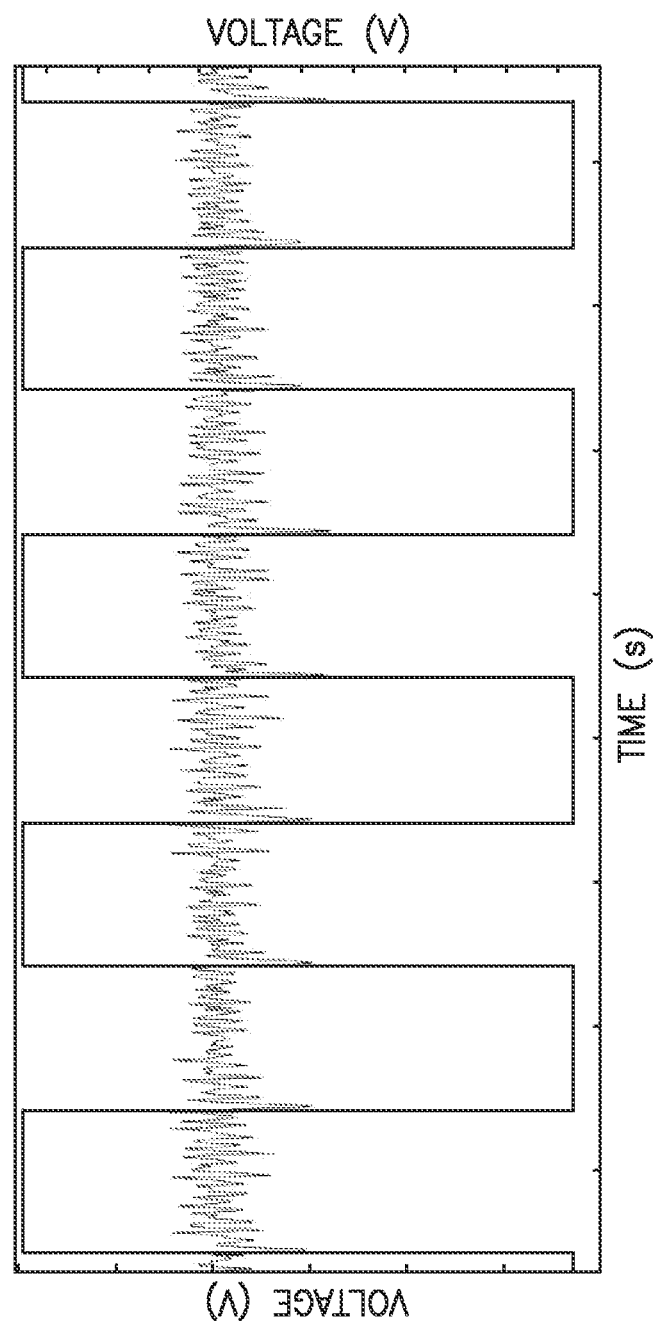
FIG. 13 is a graph of voltage versus time of a power source of the drug delivery device of FIG. 1, showing a comparison of a voltage frequency of the power source with a piezoelectric transducer connected and a 500 Hz frequency of the piezoelectric transducer.
Figure 14:
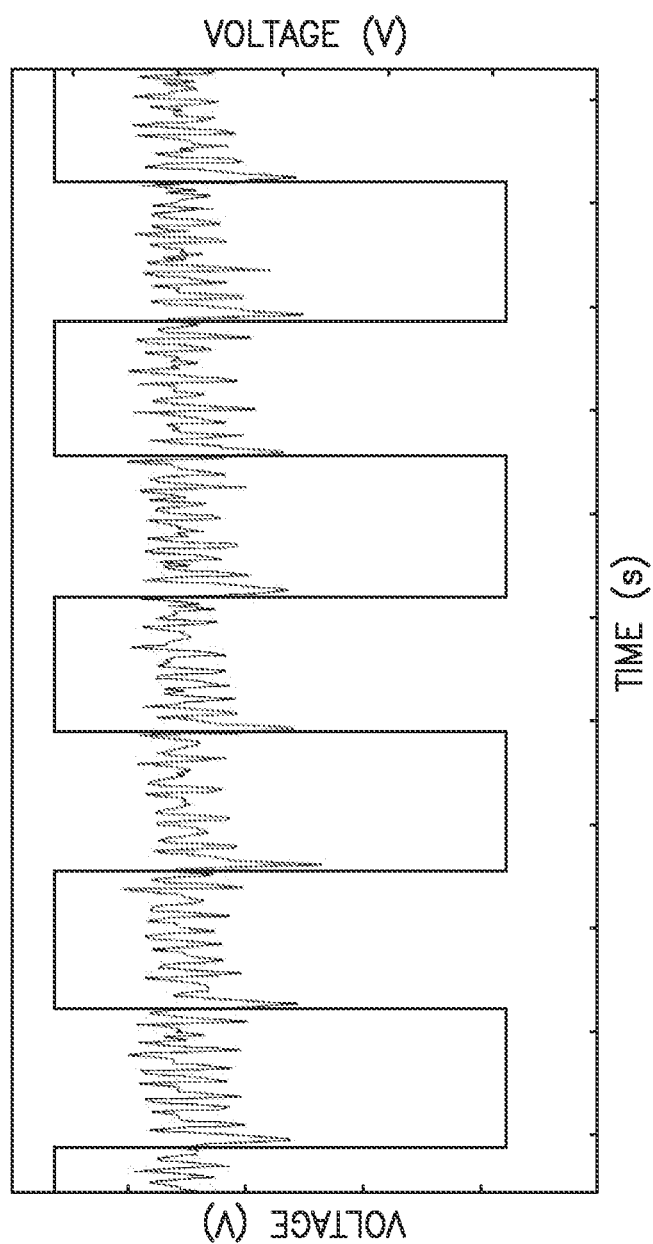
FIG. 14 is a graph of voltage versus time of a power source of the drug delivery device of FIG. 1, showing a comparison of a voltage frequency of the power source with a piezoelectric transducer connected and a 750 Hz frequency of the piezoelectric transducer.
Figure 15:
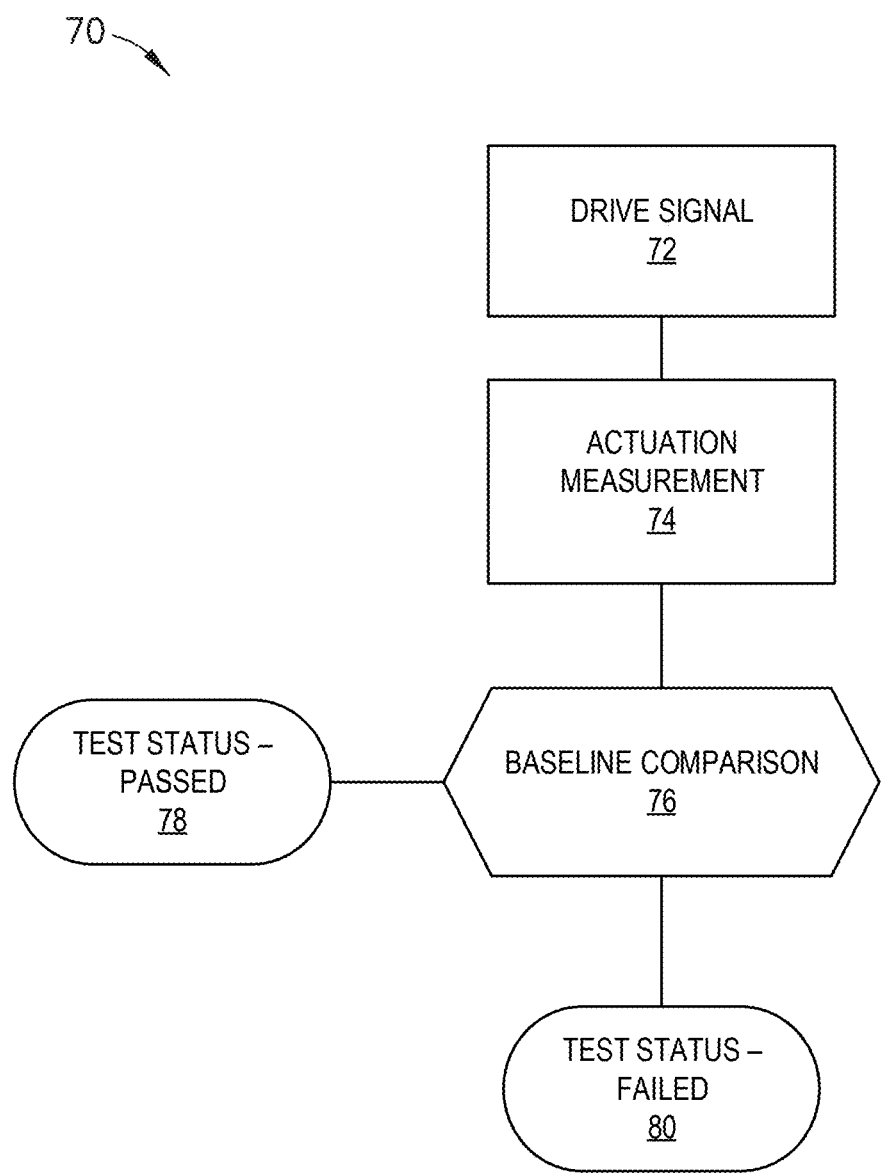
FIG. 15 is a schematic view of a method for testing a drug delivery device according to one aspect or embodiment of the present application.

Referring to FIGS. 12-14, the maximum voltage drop values with the frequency of the drive signal at 250 Hz (FIG. 12), 500 Hz (FIG. 13), and 750 Hz (FIG. 14) is shown. The frequency of the maximum voltage drop values occurs at the frequency of the drive signal when the piezoelectric transducer 50 is properly connected across various frequencies of the drive signal.

In one aspect or embodiment, the voltage is measured further away from the power source 14 and closer to where the power is supplied to the piezoelectric transducer 50. In another aspect or embodiment, instead of measuring the actuation voltage value, an actuation current value is measured and utilized to determine whether the piezoelectric transducer 50 is in the operative state or the inoperative state. The actuation current value is utilized in the same manner as the actuation voltage value, as discussed above, to determine whether the piezoelectric transducer 50 is in the operative state or the inoperative state. The actuation current value may be calculated by measuring the voltage drop across a resistor, although other suitable arrangements for measuring the actuation current value may be utilized.

Figure 16:
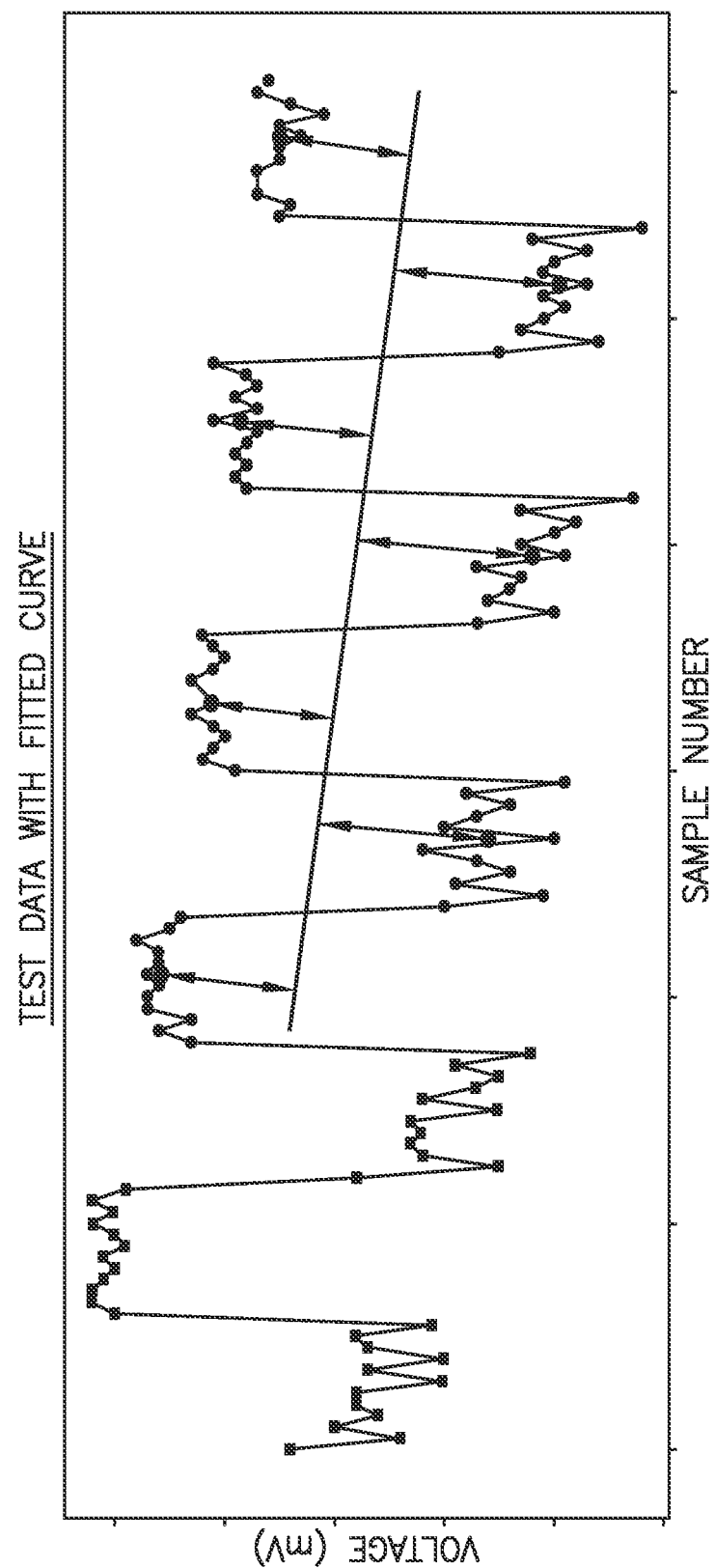
FIG. 16 is a graph of voltage versus sample number of a power source of the drug delivery device of FIG. 1, showing a voltage with a piezoelectric transducer connected.
Figure 17:
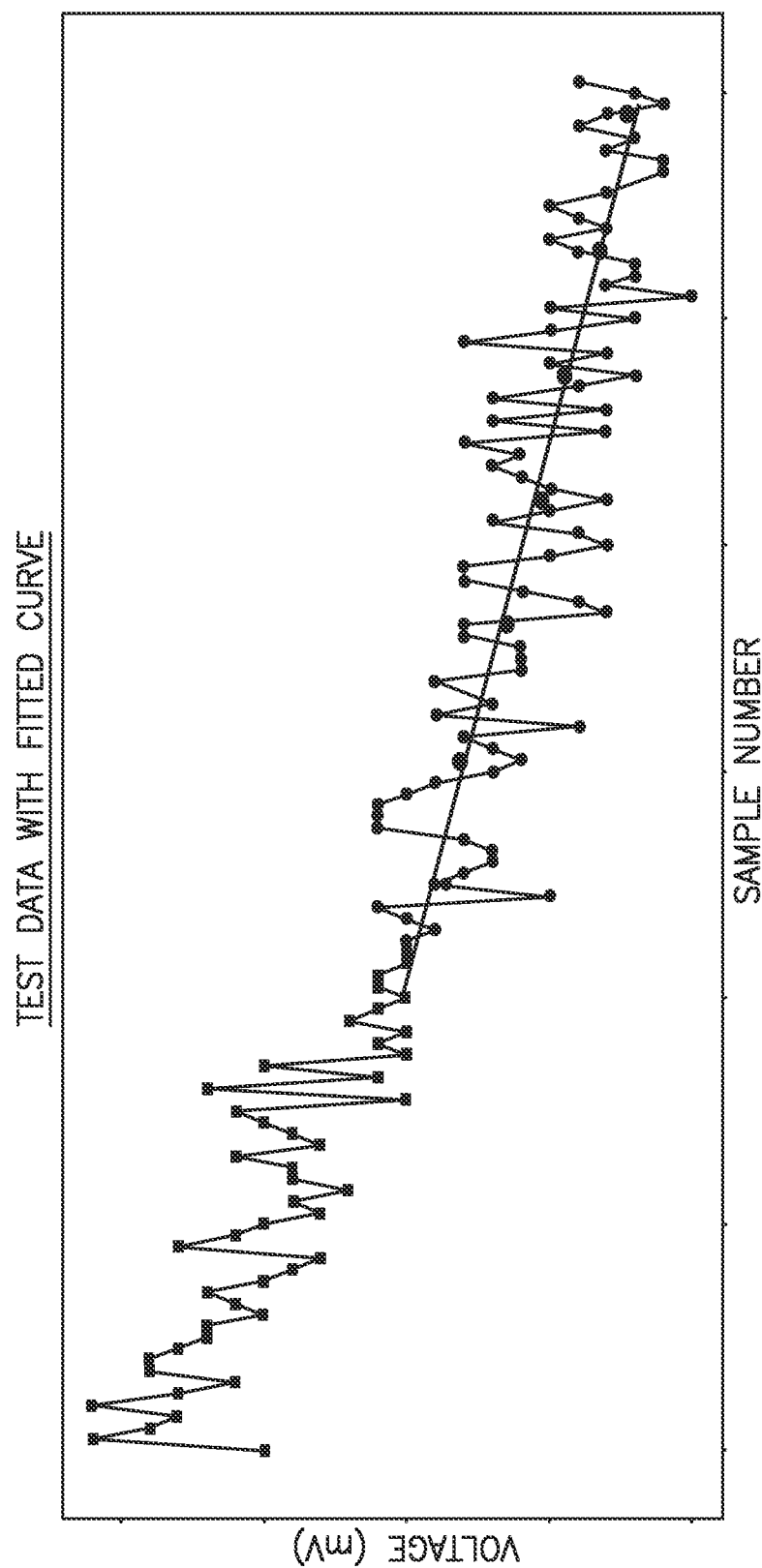
FIG. 17 is a graph of voltage versus sample number of a power source of the drug delivery device of FIG. 1, showing a voltage without a piezoelectric transducer connected.

Referring to FIGS. 16 and 17, in a further aspect or embodiment, the method for testing 70 the drug delivery device 10 includes: activating the piezoelectric transducer 50 in an on/off pattern at a rate of 5 Hz for 1 second; recording a battery voltage at a beginning of the second on/off sequence; recording 12 voltage value samples at a sampling frequency of 120 Hz during 7 on/off periods; calculating and storing an average of the on/off voltage values; using a least squares method to fit a line to all data points during the 7 recorded on/off periods; calculating a perpendicular distance from the 7 mean value points to the fitted line; returning a minimum value of the distances; and determining whether the minimum value of the distances is less than 1.5. In one aspect or embodiment, if the minimum value of the distances is less than 1.5, the piezoelectric transducer 50 is determined to not be connected. In one aspect or embodiment, if a final recorded voltage value is less than 2 V, the drug delivery device 10 is determined to fail. In one aspect or embodiment, rather than 12 voltage value samples being recorded, two or more voltage value samples are recorded. In one aspect or embodiment, rather than recording the voltage values during 7 on/off periods, the voltage values are recorded for two or more on/off periods. Further, although a sampling frequency of 120 Hz is discussed, other suitable sampling frequencies may be utilized.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method for testing a drug delivery device comprising a piezoelectric transducer, a microcontroller, and a DC power source, the piezoelectric transducer having an operative state and inoperative state, the method comprising:
    providing, by the microcontroller, a drive signal from the DC power source to the piezoelectric transducer of the drug delivery device;
    determining, via sensing circuitry, an actuation voltage value or an actuation current value in response to the drive signal;
    comparing, by the microcontroller, the actuation voltage value or the actuation current value to a predetermined baseline value stored in memory that corresponds to operational characteristics of the transducer in the operative state;
    generating, by the microcontroller, a pass/fail result based on the comparison, indicating whether the piezoelectric transducer is in the operative state or the inoperative state;
    storing or outputting the pass/fail result for device readiness verification; and
    disabling a function of the drug delivery device if the pass/fail result indicates that the piezoelectric transducer is in the inoperative state.

2. The method of claim 1, wherein the actuation voltage value or the actuation current value is determined from an average of a plurality of values measured during a predetermined period of time or from a subset of a plurality of values measured during a predetermined period of time.

3. The method of claim 1, wherein a curve fitting is used to determine the actuation voltage value or the actuation current value.

4. The method of claim 1, wherein at least one of a Fourier transform and a Fast Fourier transform is used to determine the actuation voltage value or the actuation current value.

5. The method of claim 1, wherein a signal used to determine the actuation voltage value or the actuation current value is computed over a time greater than 10 ms.

6. The method of claim 1, wherein a signal used to determine the actuation voltage value or the actuation current value is computed over a time greater than 1 ms.

7. The method of claim 1, further comprising:
determining the actuation voltage value, wherein the actuation voltage value comprises a voltage frequency of the DC power source when the drive signal is provided to the piezoelectric transducer, and wherein the baseline value comprises a known voltage frequency of the DC power source when the drive signal is provided to the piezoelectric transducer and the piezoelectric transducer is in the operative state.

8. The method of claim 1, further comprising:
determining the actuation voltage value, wherein the actuation voltage value comprises a frequency of maximum voltage drop values when the drive signal is provided to the piezoelectric transducer, and wherein the baseline value comprises a known frequency of maximum voltage drop values when the drive signal is provided to the piezoelectric transducer and the piezoelectric transducer is in the operative state.

9. The method of claim 1, further comprising:
determining the actuation voltage value, wherein the actuation voltage value comprises a minimum and maximum voltage of the DC power source when the drive signal is provided to the piezoelectric transducer, and wherein the baseline value comprises a known minimum and maximum voltage when the drive signal is provided to the piezoelectric transducer and the piezoelectric transducer is in the operative state.

10. The method of claim 1, wherein the piezoelectric transducer is determined to be in the operative state when the actuation voltage value is within a predetermined range of the baseline value.

11. The method of claim 1, wherein the piezoelectric transducer is actuated in the operative state and is not actuated in the inoperative state.

12. The method of claim 1, further comprising:
determining the actuation voltage value, wherein the determining of the actuation voltage value comprises measuring voltage at terminals of the DC power source.

13. The method of claim 1, wherein the DC power source comprises a battery.

14. A computer-implemented method for testing a drug delivery device comprising a piezoelectric transducer, a microcontroller, and a DC power source, the piezoelectric transducer having an operative state and inoperative state, the method comprising:
providing, by at least one processor, a drive signal from the DC power source to the piezoelectric transducer of the drug delivery device;
determining, by the at least one processor, an actuation voltage value in response to the drive signal;
comparing, by the at least one processor, the actuation voltage value to a predetermined baseline voltage value stored in memory that corresponds to operational characteristics of the transducer when in the operative state;
generating, by the at least one processor, a pass/fail result based on the comparison, indicating whether the piezoelectric transducer is in the operative state or the inoperative state;
storing or outputting the pass/fail result for device readiness verification; and
disabling a function of the drug delivery device if the pass/fail result indicates that the piezoelectric transducer is in the inoperative state.

15. The method of claim 14, wherein the actuation voltage value comprises a voltage frequency of the DC power source when the drive signal is provided to the piezoelectric transducer, and wherein the baseline voltage value comprises a known voltage frequency of the DC power source when the drive signal is provided to the piezoelectric transducer and the piezoelectric transducer is in the operative state.

16. The method of claim 14, wherein the actuation voltage value comprises a frequency of maximum voltage drop values when the drive signal is provided to the piezoelectric transducer, and wherein the baseline voltage value comprises a known frequency of maximum voltage drop values when the drive signal is provided to the piezoelectric transducer and the piezoelectric transducer is in the operative state.

17. The method of claim 14, wherein the actuation voltage value comprises a minimum and maximum voltage of the DC power source when the drive signal is provided to the piezoelectric transducer, and wherein the baseline voltage value comprises a known minimum and maximum voltage when the drive signal is provided to the piezoelectric transducer and the piezoelectric transducer is in the operative state.

18. A drug delivery device comprising:
a DC power source;
a cannula;
a reservoir configured to receive a fluid;
a pump configured to deliver a fluid from the reservoir to the cannula;
a piezoelectric transducer having an operative state where the piezoelectric transducer produces an audible sound and an inoperative state where the piezoelectric transducer does not produce an audible sound; and
a microcontroller comprising at least one processor programmed or configured to:
provide a drive signal to the piezoelectric transducer;
determine an actuation voltage value or an actuation current value in response to the drive signal;
compare, by the at least one processor, the actuation voltage value or the actuation current value to a baseline value stored in memory that corresponds to operational characteristics of the piezoelectric transducer in the operative state;
generate, by the at least one processor, a pass/fail result based on the comparison indicating whether the piezoelectric transducer is in the operative state or the inoperative state;
store or output the pass/fail result for device readiness verification.

19. The device of claim 18, further comprising:
determining the actuation voltage value, wherein the actuation voltage value comprises a voltage frequency of the DC power source when the drive signal is provided to the piezoelectric transducer, and wherein the baseline value comprises a known voltage frequency of the DC power source when the drive signal is provided to the piezoelectric transducer and the piezoelectric transducer is in the operative state.

20. The device of claim 18, further comprising:
determining the actuation voltage value, wherein the actuation voltage value comprises a frequency of maximum voltage drop values when the drive signal is provided to the piezoelectric transducer, and wherein the baseline value comprises a known frequency of maximum voltage drop values when the drive signal is provided to the piezoelectric transducer and the piezoelectric transducer is in the operative state.

21. The device of claim 18, further comprising:
determining the actuation voltage value, wherein the actuation voltage value comprises a minimum and maximum voltage of the DC power source when the drive signal is provided to the piezoelectric transducer, and wherein the baseline voltage value comprises a known minimum and maximum voltage when the drive signal is provided to the piezoelectric transducer and the piezoelectric transducer is in the operative state.

22. A computer program product for testing a drug delivery device comprising a piezoelectric transducer, a microcontroller, and a DC power source, the piezoelectric transducer having an operative state and inoperative state, the computer program product comprising at least one non-transitory computer-readable medium including program instructions that, when executed by the microcontroller, cause the microcontroller to:
provide a drive signal from the DC power source to the piezoelectric transducer;
determine an actuation voltage value or an actuation current value in response to the drive signal;
compare the actuation voltage value or the actuation current value to a predetermined baseline value stored in memory that corresponds to operational characteristics of the transducer when in the operative state;
generate a pass/fail result based on the comparison indicating whether the piezoelectric transducer is in the operative state or the inoperative state;
store or output the pass/fail result for device readiness verification; and
disabling a function of the drug delivery device if the pass/fail result indicates that the piezoelectric transducer is in the inoperative state.

23. The computer program product of claim 22, further comprising:
determining the actuation voltage value, wherein the actuation voltage value comprises a voltage frequency of the DC power source when the drive signal is provided to the piezoelectric transducer, and wherein the baseline value comprises a known voltage frequency of the DC power source when the drive signal is provided to the piezoelectric transducer and the piezoelectric transducer is in the operative state.

24. The computer program product of claim 22, further comprising:
determining the actuation voltage value, wherein the actuation voltage value comprises a frequency of maximum voltage drop values when the drive signal is provided to the piezoelectric transducer, and wherein the baseline value comprises a known frequency of maximum voltage drop values when the drive signal is provided to the piezoelectric transducer and the piezoelectric transducer is in the operative state.

25. The computer program product of claim 22, further comprising:
determining the actuation voltage value, wherein the actuation voltage value comprises a minimum and maximum voltage of the DC power source when the drive signal is provided to the piezoelectric transducer, and wherein the baseline value comprises a known minimum and maximum voltage when the drive signal is provided to the piezoelectric transducer and the piezoelectric transducer is in the operative state.

* * * * *